US009507386B2

(12) United States Patent
Rosen et al.

(10) Patent No.: US 9,507,386 B2
(45) Date of Patent: Nov. 29, 2016

(54) DUAL PIVOT MECHANICAL HINGE WITH DISCREET WIRING

(71) Applicant: MICROSOFT TECHNOLOGY LICENSING, LLC, Redmond, WA (US)

(72) Inventors: David I. Rosen, Bellevue, WA (US); Joshua C. Grant, Kirkland, WA (US); Eugene Lee, Bellevue, WA (US); David O. Whitt, III, Sammamish, WA (US); Hua Wang, Sammamish, WA (US); Filipp Demenschonok, Seattle, WA (US); Rahul Marwah, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 14/698,703

(22) Filed: Apr. 28, 2015

(65) Prior Publication Data

US 2016/0320809 A1  Nov. 3, 2016

(51) Int. Cl.
*G06F 1/16* (2006.01)
*E05D 3/02* (2006.01)

(52) U.S. Cl.
CPC ............. *G06F 1/1669* (2013.01); *E05D 3/02* (2013.01); *G06F 1/1683* (2013.01)

(58) Field of Classification Search
CPC .. G06F 1/1669; G06F 1/1683; G06F 1/1675; E05D 3/02
USPC ..................................... 361/679.17; 345/169
See application file for complete search history.

(56) References Cited

U.S. PATENT DOCUMENTS 5,007,849 A    4/1991  Shinoda
5,278,725 A *  1/1994  Konno .................. G06F 1/1616
                                             16/223

(Continued)

FOREIGN PATENT DOCUMENTS

JP    2004164528 A    6/2004
JP    2007251512 A    9/2007
WO   2010100843 A1    9/2010

OTHER PUBLICATIONS

Hamburger, Ellis, "The Best iPad Keyboard: Is it Time to Finally Ditch your Laptop?", Published on: Aug. 9, 2012, 15 pages, Available at: http://www.theverge.com/2012/8/9/3229047/best-ipad-keyboard.

(Continued)

*Primary Examiner* — Dion R Ferguson
*Assistant Examiner* — Mandeep S Buttar
(74) *Attorney, Agent, or Firm* — Qudus Olaniran; Judy Yee; Micky Minhas (57) ABSTRACT

Examples include discreet wiring coupling a physical keyboard to a mobile device. The keyboard includes a user interface component including a first housing body aligned substantially along a first axis, a device interface component including a second housing body aligned substantially along a second axis, and one or more conductors coupling the user interface component to the device interface component. A hinge assembly includes a first hinge body coupled to the first housing body such that the hinge assembly is movably coupled to the user interface component and a second hinge body coupled to the second housing body such that the hinge assembly is movably coupled to the device interface component. The conductors include a first segment extending substantially along the first axis and a second segment extending substantially along the second axis. Aspects enable a user to use a physical keyboard to provide input to the mobile device.

18 Claims, 9 Drawing Sheets

(56) References Cited

U.S. PATENT DOCUMENTS

| | | | |
|---|---|---|---|
| 6,385,039 B1 | 5/2002 | Chiang et al. | |
| 6,532,147 B1 | 3/2003 | Christ et al. | |
| 6,781,819 B2* | 8/2004 | Yang | G06F 1/162 341/22 |
| 6,980,420 B2* | 12/2005 | Maskatia | G06F 1/1616 248/917 |
| 7,327,560 B1 | 2/2008 | Tabasso et al. | |
| 7,516,923 B2 | 4/2009 | Rossini | |
| 8,087,129 B2 | 1/2012 | Lambert | |
| 8,307,509 B2 | 11/2012 | Schau | |
| 8,320,123 B2 | 11/2012 | Chen | |
| 8,405,965 B2 | 3/2013 | Senatori et al. | |
| 8,713,759 B2 | 5/2014 | Cai | |
| 8,917,498 B2 | 12/2014 | Mai et al. | |
| 2004/0198416 A1 | 10/2004 | Gardner et al. | |
| 2007/0085834 A1 | 4/2007 | Northway | |
| 2007/0289097 A1 | 12/2007 | Barnett | |
| 2011/0279954 A1 | 11/2011 | Sendora | |
| 2014/0036423 A1 | 2/2014 | Tanaka | |
| 2015/0042567 A1* | 2/2015 | Funakoshi | G06F 3/0202 345/168 |

OTHER PUBLICATIONS

"International Search Report and Written Opinion Issued in PCT Application No. PCT/US2016/026083", Mailed Date: Jul. 11, 2016, 16 Pages.

\* cited by examiner

DUAL PIVOT MECHANICAL HINGE WITH DISCREET WIRING

BRIEF DESCRIPTION OF THE DRAWINGS

Corresponding reference characters indicate corresponding parts throughout the drawings.

DETAILED DESCRIPTION

Known mobile devices, such as tablets, smartphones, and/or phablets, include a touchscreen that displays or presents content (e.g., images, alphanumeric characters). Mobile devices are increasingly used for a variety of purposes including word processing or electronic mail ("e-mail"). To prompt input (e.g., typing), at least some known mobile devices display a virtual keyboard on the touchscreen. Typing on the touchscreen, however, may be awkward, tedious, or time consuming. To improve typability, at least some mobile devices may be coupled with a physical keyboard. These keyboards can communicate with the mobile device by wired and/or wireless connections. At least some known wired connections, however, are exposed to the environment and, thus, may be susceptible to additional wear and tear and/or be aesthetically unpleasant. To address some of these issues, mobile devices may use a wireless connection with a keyboard. However, at least some known wireless systems used to couple a mobile device to a keyboard are costly and/or require a separate power source.

Examples of the disclosure include discreet wiring that communicatively couples a physical keyboard to a mobile device. Some examples include an input portion including a first housing body aligned substantially along a first axis, a device interface including a second housing body aligned substantially along a second axis, a hinge assembly, and one or more conductors coupling the input portion to the device interface. The hinge assembly is a dual-pivot mechanical hinge including a first hinge body coupled to the first housing body such that the hinge assembly is movably coupled to the input portion and a second hinge body coupled to the second housing body such that the hinge assembly is movably coupled to the device interface. The conductors include at least a first segment extending substantially along the first axis and a second segment extending substantially along the second axis.

Aspects of the disclosure enable a peripheral device (e.g., physical keyboard) to be used in a mobile device environment, such that a user may have a user-friendly manner to provide input (e.g., via typing) to the mobile device. For example, the dual pivot hinge architecture described herein discreetly incorporates conductors extending between the physical keyboard and the mobile device. By incorporating the dual pivot hinge architecture and the conductors in the manner described in this disclosure, some examples enable miniaturization, e.g., require less space for functionality, improved usability, and/or enhanced reliability and robustness of a device.

Figure 1:
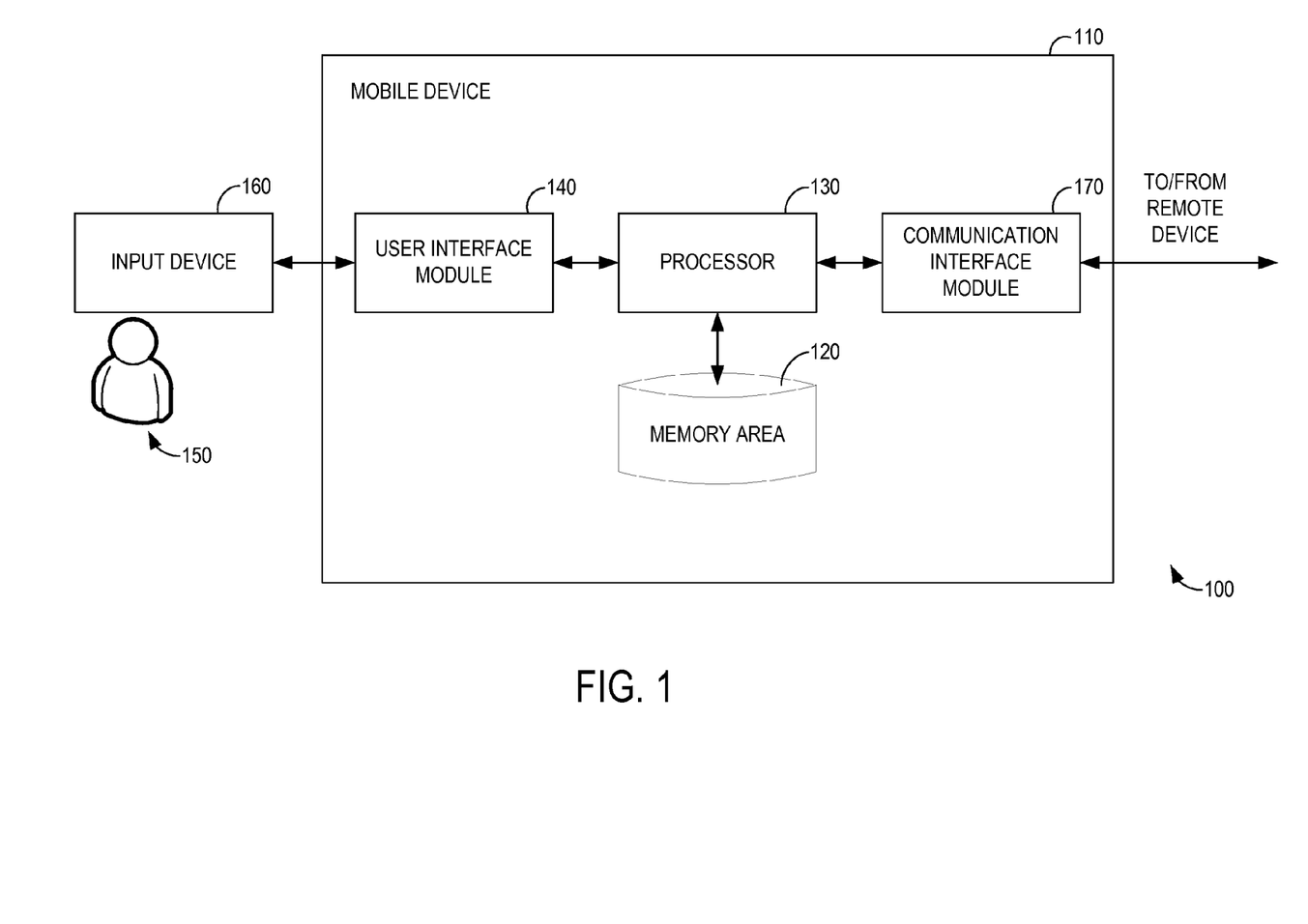
FIG. 1 is a block diagram of an example mobile device and an example input device coupled to the mobile device.

FIG. 1 is a block diagram of an example environment 100 including a mobile device 110. In some examples, the mobile device 110 may be or include a tablet, a smartphone, a mobile telephone, a phablet, a laptop, a portable media player, a netbook, a computing pad, a desktop computer, or a game console. While some examples of the disclosure are illustrated and described herein with reference to a mobile device 110, aspects of the disclosure are operable with any computing or electronic device that executes instructions to implement the operations and functionality associated with the computing device.

In this example, the mobile device 110 includes one or more computer-readable media, such as a memory area 120 storing computer-executable instructions, user data, and/or any other data, and one or more processors 130 programmed to execute the computer-executable instructions for implementing operations and functionality associated with the computing device. The memory area 120 includes any quantity of media associated with or accessible by the computing device. The memory area 120 may be internal to the computing device (as shown in FIG. 1), external to the computing device (not shown), or both (not shown).

In some examples, the memory area 120 stores, among other data, one or more applications. The applications, when executed by the processor 130, operate to perform functionality on the mobile device 110. Example applications include a mail application program, a web browser, a calendar application program, an address book application program, a messaging program, a media program, a location-based service program, a search program, and the like. The applications may communicate with counterpart applications or services, such as web services accessible via a network (not shown). For example, the applications may represent downloaded client-side applications that correspond to server-side services executing in the cloud.

The processor 130 includes any quantity of processing units, and the instructions may be performed by the processor 130 or by multiple processors within the computing device or performed by a processor external to the computing device. In some examples, the processor 130 is transformed into a special purpose microprocessor by executing computer-executable instructions or by otherwise being programmed. Although the processor 130 is shown separate from the memory area 120, examples of the disclosure contemplate that the memory area 120 may be onboard the processor 130 such as in some embedded systems.

In some examples, the mobile device 110 includes one or more user interface modules 140 for exchanging data between the mobile device 110 and a user 150. For example, the user interface module 140 includes or is coupled to a presentation device configured to present information, such as text, images, audio, video, graphics, alerts, and the like, to the user 150. The presentation device may include, without limitation, a monitor, a display, a speaker, a printer, and/or a vibrating component. Additionally or alternatively, the user interface module 140 includes or is coupled to an input device 160 configured to receive input from the user 150. The input device 160 may include, without limitation, a keyboard, a mouse, a controller, and/or a remote control. In at least some examples, the presentation device and the input device 160 are integrated in a common device configured to present information to the user 150 and receive information from the user 150. For example, the user-interface device may include, without limitation, a capacitive touch screen display and/or a controller including a vibrating component.

In some examples, the mobile device 110 includes at least one communication interface module 170 for exchanging data between the mobile device 110 and a computer-readable media and/or another computing device. Communication between the mobile device 110 and a computer-readable media and/or another computing device may occur using any protocol or mechanism over any wired or wireless connection. For example, the mobile device 110 may communicate with a computer-readable media and/or another computing device using a BLUETOOTH brand wireless technology standard, a WI-FI brand wireless technology standard (e.g., IEEE 802.11), and/or a cellular network technology standard (e.g., WiMAX, LTE). (BLUETOOTH is a trademark of Bluetooth Special Interest Group; WI-FI is a trademark of the Wi-Fi Alliance; WiMAX is a trademark of the WiMax Forum; LTE is a trademark of the European Telecommunications Standards Institute).

The block diagram of FIG. 1 is merely illustrative of an example environment that may be used in connection with one or more examples of the disclosure and is not intended to be limiting in any way. Further, other peripherals or components of the computing devices known in the art are not shown, but are operable with aspects of the disclosure. At least a portion of the functionality of the various elements in FIG. 1 may be performed by other elements in FIG. 1, or an entity (e.g., processor, web service, server, applications, computing device, etc.) not shown in FIG. 1.

Figure 2:
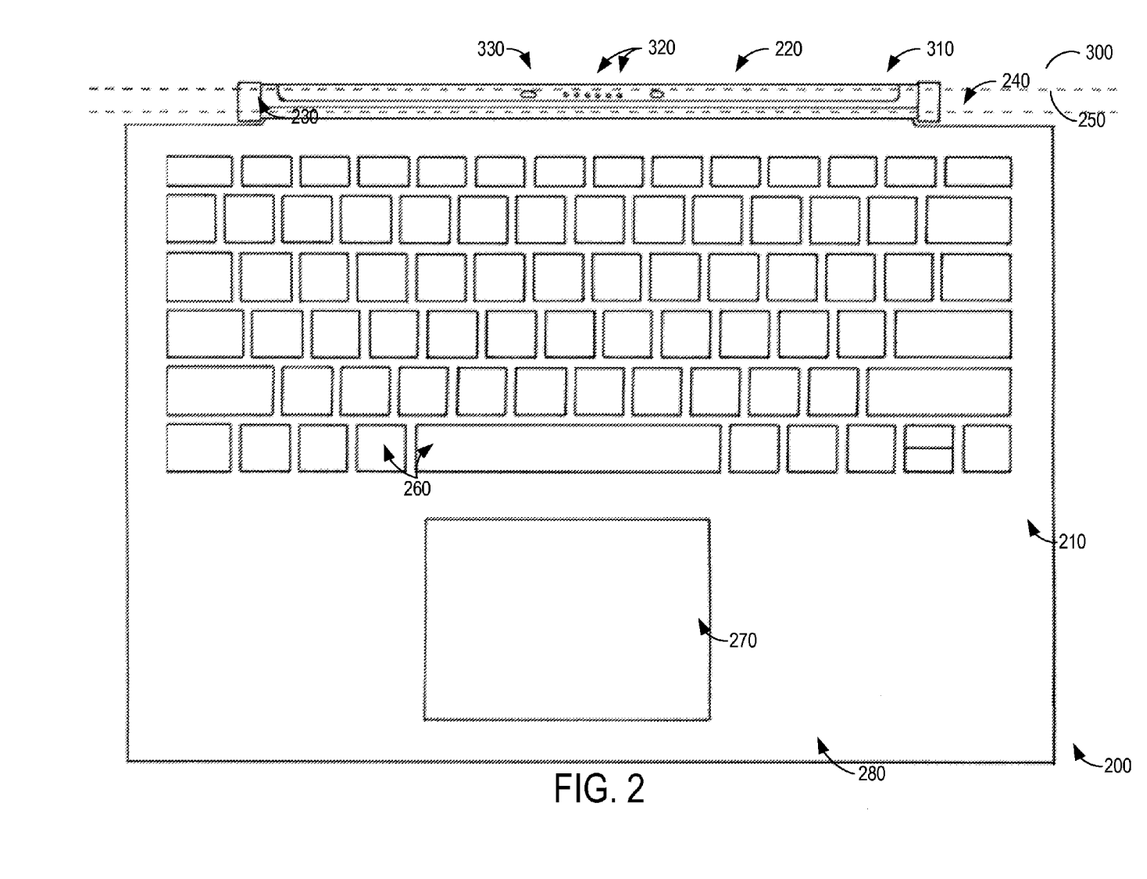
FIG. 2 is a front plan view of an example detachable keyboard that may be used with a mobile device, such as the mobile device shown in FIG. 1.
Figure 3:
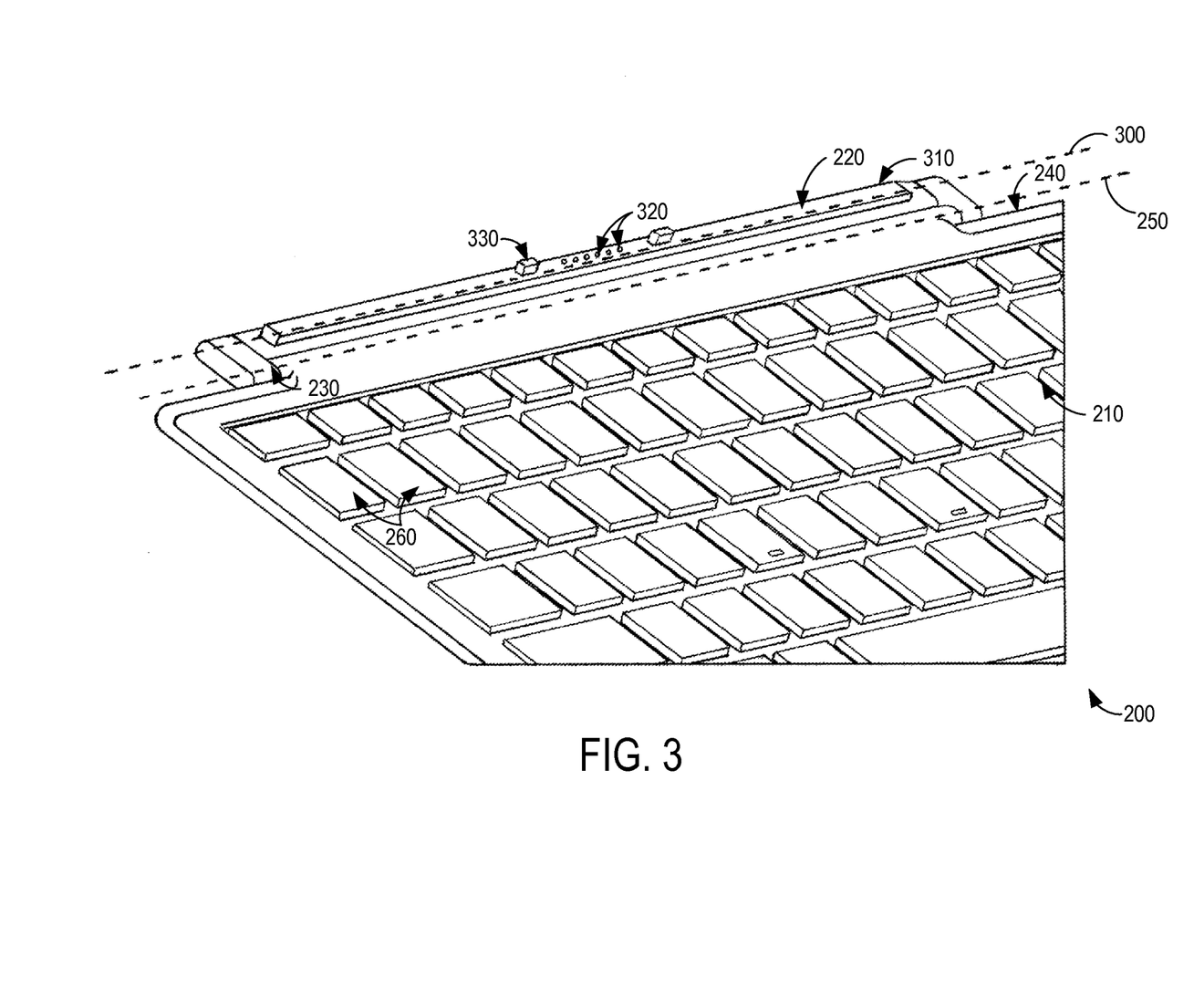
FIG. 3 is a front perspective view of an upper portion of a detachable keyboard, such as the detachable keyboard shown in FIG. 2.

FIG. 2 is a front plan view of a detachable keyboard 200 (e.g., an input device 160) that is removably coupleable to the mobile device 110 (shown in FIG. 1). Alternatively, any other input device (e.g., music kit) may be removably coupleable to the mobile device 110 that enables the environment 100 (shown in FIG. 1) to function as described herein. FIG. 3 is a perspective view of an upper portion of the keyboard 200. The keyboard 200 includes at least an input portion or user interface component 210, and a device interface or device interface component 220 coupled to the user interface component 210.

The user interface component 210 is configured to receive input from the user 150 (shown in FIG. 1). The user interface component 210 includes a first housing body 230 positioned at or adjacent an upper edge portion 240 of the user interface component 210 and aligned substantially along a first axis 250 of rotation. Unless otherwise stated, adjectives such as "approximately," "substantially," and "about" modifying a condition or relationship characteristic of a feature or features of a disclosed example are understood to mean that the condition or the relationship characteristic is defined to within tolerances that are acceptable for operation of the example for an application for which it is intended.

The first housing body 230 may be substantially cylindrical in shape. Alternatively, the first housing body 230 may have any shaped or configuration that enables the user interface component 210 to function as described herein. In some examples, the user interface component 210 includes a plurality of keys 260 and/or a touchpad 270 (shown in FIG. 2). For example, the keys 260 may be arranged in a QWERTY keyboard layout, and the touchpad 270 may be positioned substantially centered laterally and between the keys 260 and a lower edge portion 280 (shown in FIG. 2) of the user interface component 210. Alternatively, the user interface component 210 may include any input mechanism positioned in any arrangement that enables the keyboard 200 to function as described herein.

The device interface component 220 is configured to interface with the mobile device 110 (shown in FIG. 1). The device interface component 220 includes a second housing body 290 (shown in FIG. 4) aligned substantially along a second axis 300 of rotation. In at least some examples, the first axis 250 is substantially parallel to the second axis 300 such that the first housing body 230 is substantially parallel to the second housing body 290. Alternatively, the first housing body 230 and the second housing body 290 may have any relative orientation that enables the keyboard 200 to function as described herein.

In some examples, the device interface component 220 includes a platform 310 configured to interface with or receive the mobile device 110. The platform 310 may include one or more pins 320 that are electrically coupleable to the mobile device 110 and/or one or more stabilizing mechanisms 330 that are configured to maintain a position of the mobile device 110 on the platform 310. Additionally, the device interface component 220 may include one or more magnets 340 (shown in FIG. 4) that are magnetically coupleable to the mobile device 110 to facilitate maintaining a position of the mobile device 110 on the platform 310. Alternatively, the platform 310 may be configured to receive any other computing or electrical device that enables the keyboard 200 to function as described herein.

Figure 4:
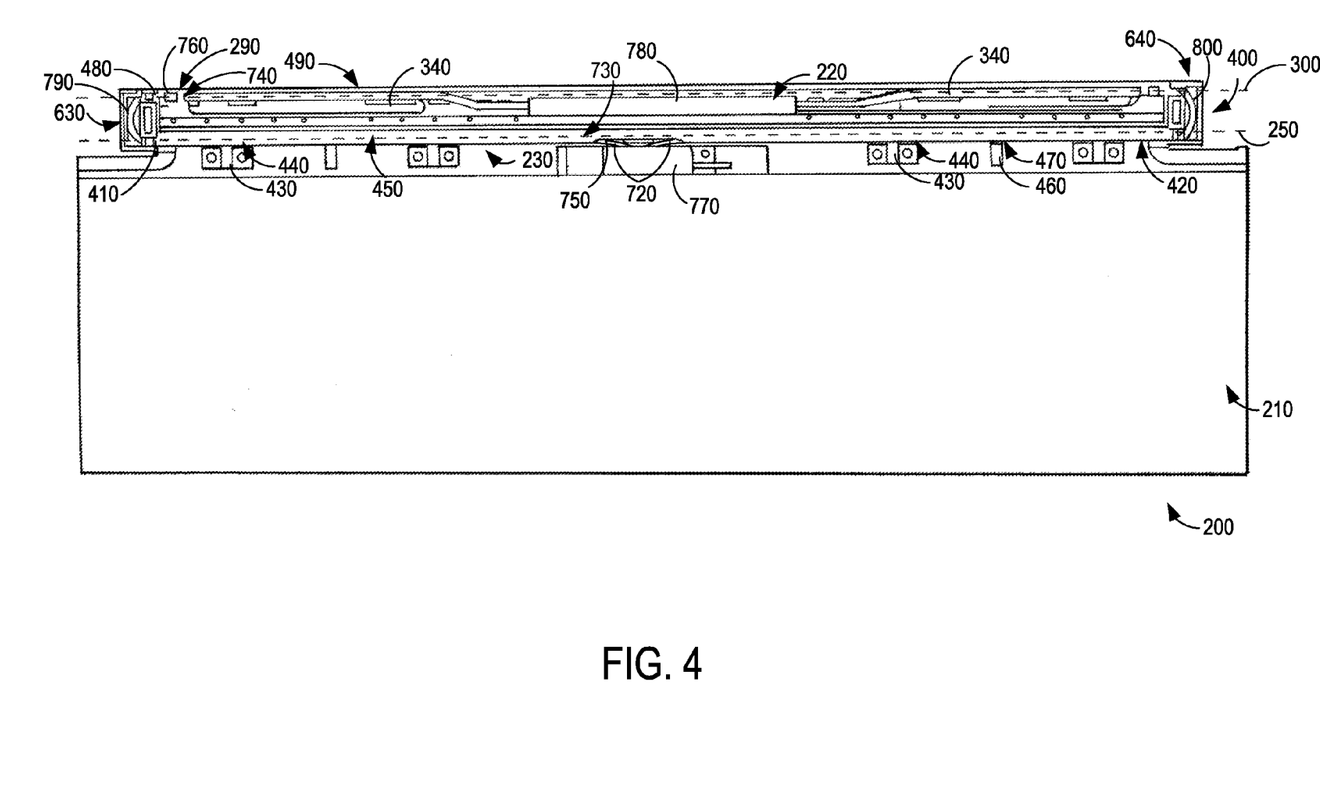
FIG. 4 is a rear plan view of an inner, upper portion of a detachable keyboard, such as the detachable keyboard shown in FIG. 2.
Figure 5:
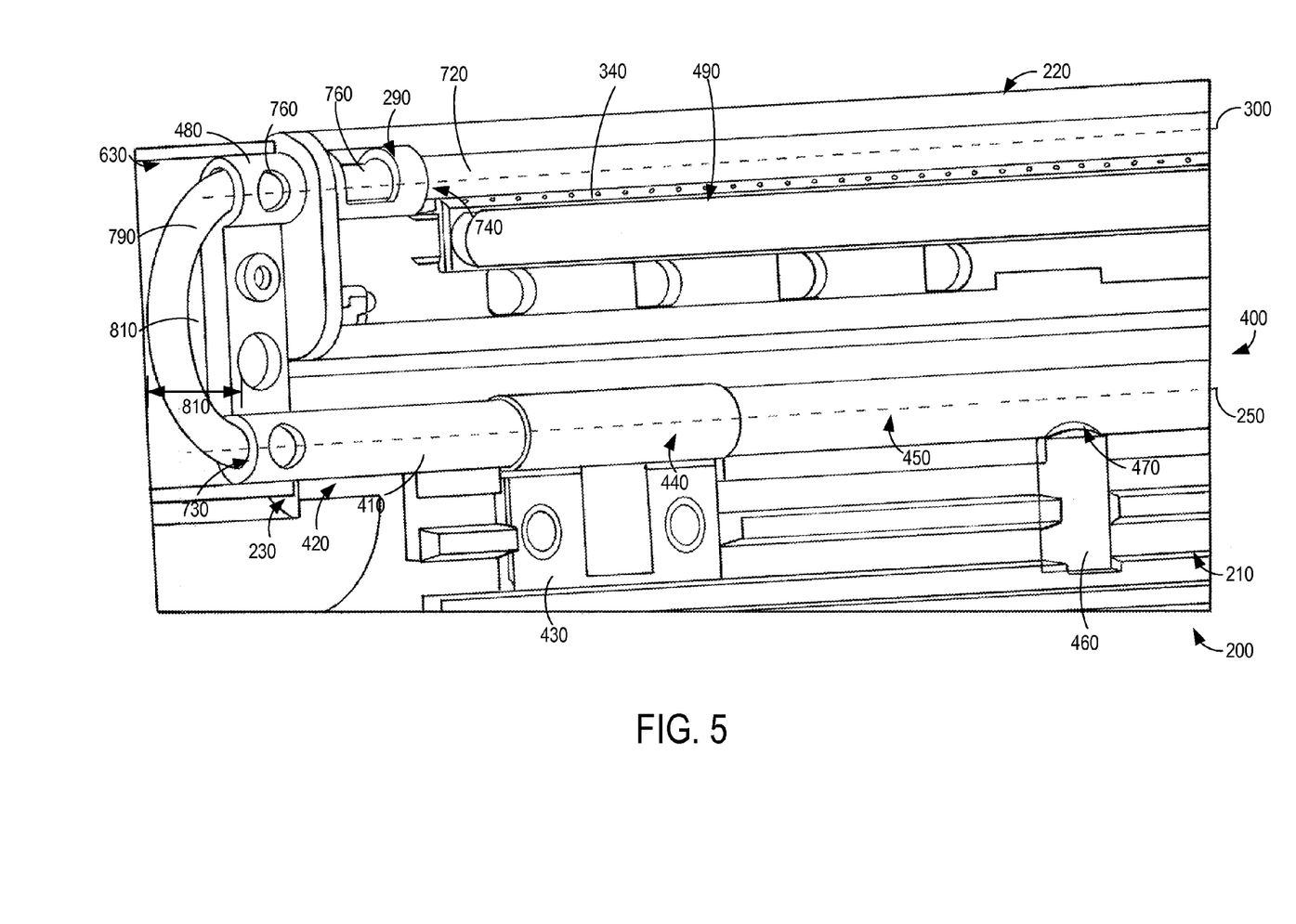
FIGS. 5-8 are rear perspective views of an inner, upper portion of a detachable keyboard, such as the detachable keyboard shown in FIG. 2.

FIG. 4 is a rear plan view of an inner, upper portion of the keyboard 200. FIG. 5 is a perspective rear view of an inner, upper portion of the keyboard 200. The keyboard 200 includes a dual pivot mechanical hinge assembly 400 that couples the user interface component 210 to the device interface component 220. The hinge assembly 400 includes a first hinge body 410 (e.g., a first tubular body) that is coupled to the first housing body 230 substantially along the first axis 250 such that the hinge assembly 400 is movably coupled to the user interface component 210 (e.g., the hinge assembly 400 is coupled to the user interface component 210 such that the hinge assembly 400 is moveable with respect to the user interface component 210). In some examples, the first hinge body 410 is coupled to the first housing body 230 such that the first hinge body 410 extends substantially along and is rotatable about the first axis 250. For example, the first hinge body 410 may extend within a first housing cavity 420 at least partially defined by the user interface component 210 or, more particularly, the first housing body 230 such that the first hinge body 410 is rotatable about the first axis 250 within the first housing cavity 420.

In at least some examples, the hinge assembly 400 includes one or more friction generating mechanisms 430 that generate friction when the hinge assembly 400 or, more particularly, the first hinge body 410 is rotated about the first axis 250. For example, the friction generating mechanism 430 may be securely coupled to the user interface component 210 such that, as the first hinge body 410 is rotated about the first axis 250, the friction generating mechanism 430 remains fixed and, thus, generates friction between the friction generating mechanism 430 and the first hinge body 410. This allows for a movement of the hinge assembly 400 relative to the user interface component 210 to have a particular feel to the user 150 (shown in FIG. 1) (e.g., a desired amount of resistance). A segment 440 of the first hinge body 410 proximate to the friction generating mechanism 430 may have a diameter that is wider than a diameter of a segment 450 of the first hinge body 410 remote from the friction generating mechanism 430.

In at least some examples, the hinge assembly 400 includes one or more biasing mechanisms 460 that are configured to secure a relative orientation of the hinge assembly 400 and the user interface component 210. The biasing mechanism 460 may be coupled to the user interface component 210 and moveable between a retracted position and an extended position. In at least some examples, the biasing mechanism 460 is biased towards the extended position (e.g., via a spring), and the first hinge body 410 defines an indenture or notch 470 configured to receive the biasing mechanism 460 such that, when the biasing mechanism 460 is positioned within the notch 470, the hinge assembly 400 is secured in a predetermined orientation relative to the first housing body 230. The first hinge body 410 may have any number of notches that enable the hinge assembly 400 to be secured in a corresponding number of orientations relative to the first housing body 230. In some examples, one or more biasing mechanisms 460 allow for electrical signals to pass through the biasing mechanisms 460 and/or the first housing body 230 (e.g., as an electrical ground).

The hinge assembly 400 includes a second hinge body 480 (e.g., a second tubular body) that is coupled to the second housing body 290 such that the hinge assembly 400 is movably coupled to the device interface component 220. The device interface component 220 may include a plurality of clamshelled pieces (e.g., a plastic piece and an aluminum piece) that are coupled together (e.g., using glue), and a fabric element that extends over at least the aluminum piece to facilitate concealing the aluminum piece.

Figure 6:
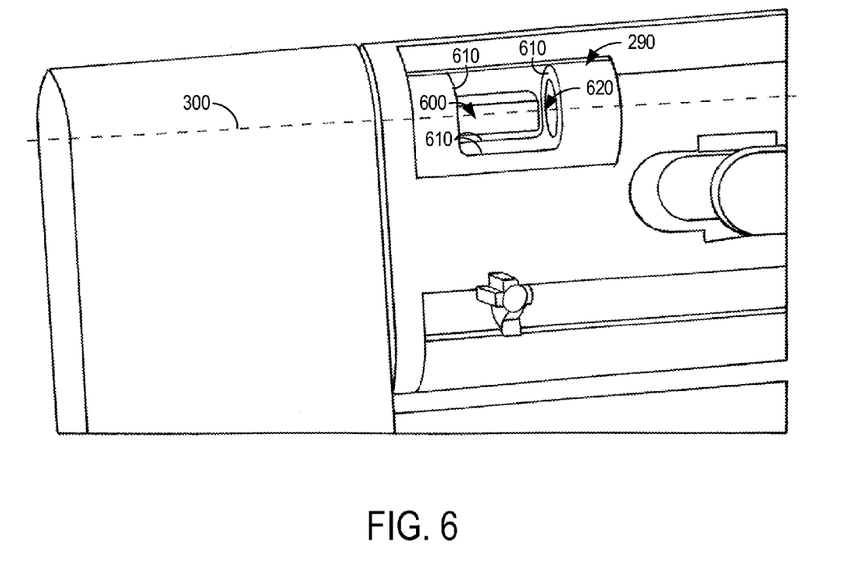

In some examples, the second hinge body 480 is coupled to the second housing body 290 substantially along the second axis 300 such that the second hinge body 480 extends substantially along and is rotatable about the second axis 300. In at least some examples, the second hinge body 480 extends within a second housing cavity 490 at least partially defined by the device interface component 220 such that the second hinge body 480 is rotatable about the second axis 300 within the second housing cavity 490. For example, as shown in FIG. 6, the second hinge body 480 includes an extension member 600 (e.g., a pin), and the second housing body 290 includes one or more inner edge portions 610 that at least partially define a slot 620 configured to receive the extension member 600. The extension member 600 is moveable or slidable within the slot 620 as the hinge assembly 400 is rotated about the second axis 300. The inner edge portions 610 limit a movement of the extension member 600 within the slot 620.

In some examples, the hinge assembly 400 is configured to enable the mobile device 110 to move with respect to the detachable keyboard 200 between an open configuration (e.g., the mobile device 110 and the detachable keyboard 200 are positioned adjacent one another and substantially flat such that a display screen of the mobile device 110 and the keys 260 of the keyboard 200 are facing substantially the same direction) and a closed configuration (e.g., the mobile device 110 is positioned above and substantially parallel to the detachable keyboard 200 such that the display screen of the mobile device 110 is facing the keys 260 of the keyboard 200). The mobile device 110 may be positioned in one or more operating configurations (e.g., the mobile device 110 is positioned at an angle between approximately 90 degrees and 135 degrees relative to the keyboard 200).

Referring back to FIGS. 4 and 5, in at least some examples, the hinge assembly 400 includes a first end cap 630 and a second end cap 640 (shown in FIG. 4). Each end cap 630, 640 may include a plurality of clamshelled pieces that are coupled together (e.g., using glue), and an anodized aluminum shell that is pressed over the clamshelled pieces to facilitate concealing a seam between the clamshelled pieces. At least a portion of the first hinge body 410 and/or the second hinge body 480 extend between the first end cap 630 and the second end cap 640.

In at least some examples, the first end cap 630 and the second end cap 640 are each coupled to the first hinge body 410 such that the first end cap 630 and the second end cap 640 are each configured to rotate about the first axis 250 as the first hinge body 410 is rotated about the first axis 250. This allows for the end caps 630, 640 to rotate in sync with each other and facilitate increasing a stability of the hinge assembly 400. The first end cap 630 and the second end cap 640 may each be coupled to the second hinge body 480 such that the first end cap 630 and the second end cap 640 may each be configured to rotate about the second axis 300 as the second hinge body 480 is rotated about the second axis 300.

Figure 7:
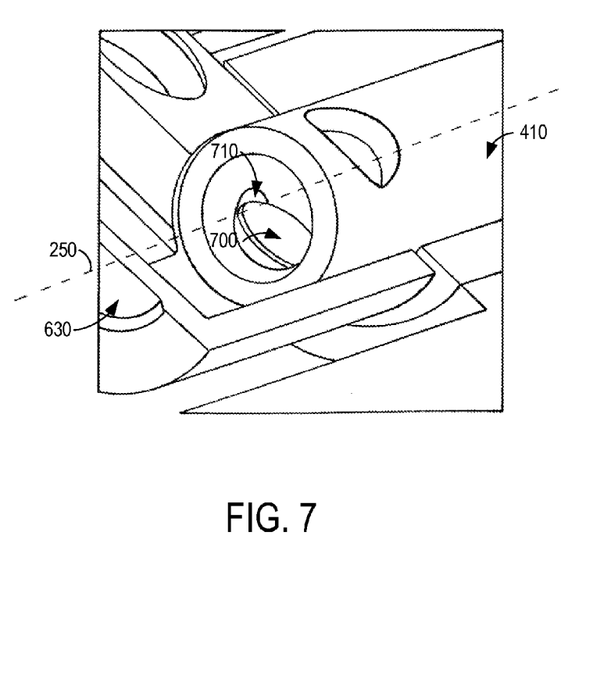

For example, as shown in FIG. 7, the first end cap 630 includes an extension member 700 (e.g., a pin), and the first hinge body 410 defines an opening 710 sized to receive the extension member 700. The first end cap 630 is coupled to the first hinge body 410 such that the first end cap 630 is configured to rotate about the first axis 250 as the first hinge body 410 is rotated about the first axis 250. This allows for the first end cap 630 to rotate in sync with the first hinge body 410 and facilitate increasing a rigidity of the hinge assembly 400. The second end cap 640 may also be coupled to the first hinge body 410 using a pin-and-opening mechanism. Additionally, the first end cap 630 and/or the second end cap 640 may be coupled to the second hinge body 480 using a pin-and-opening mechanism such that the first end cap 630 and/or the second end cap 640 are configured to rotate about the second axis 300 as the second hinge body 480 is rotated about the second axis 300.

Referring back to FIGS. 4 and 5, one or more conductors 720 (e.g., wires or wire bundles) extend between the user interface component 210 and the device interface component 220 to couple the user interface component 210 to the device interface component 220. For example, the conductors 720 may transmit input received at the device interface component 220 (e.g., from the user 150 striking keys 260 or interacting with the touchpad 270) to the mobile device 110 via the device interface component 220.

The conductors 720 are discreetly positioned within a first hinge cavity 730 at least partially defined by the first hinge body 410 and/or a second hinge cavity 740 at least partially defined by the second hinge body 480. That is, in at least some examples, the conductors 720 are not exposed to the ambient environment or positioned outside the user interface component 210, the device interface component, 220, and the hinge assembly 400. In at least some examples, the conductors 720 include at least a first segment 750 extending within the first hinge cavity 730 substantially along the first axis 250 and a second segment 760 extending within the second hinge cavity 740 substantially along the second axis 300. This allows for electrical signals to pass through the hinge (e.g., along the first axis 250 and along the second axis 300). In at least some examples, one or more conductors 720 travel over the first segment 750 and the second segment 760 without a break in the conductor 720.

The first segment 750 may be coupled (e.g., via soldering) to a first printed circuit board (PCB) 770 (shown in FIG. 4)

housed within the user interface component 210, and the second segment 760 may be coupled (e.g., via soldering) to a second PCB 780 (shown in FIG. 4) housed with the device interface component 220. The second PCB 780 may include or be coupled to the pins 320 (shown in FIGS. 2 and 3). In at least some examples, at least a portion of the first segment 750 and/or the second segment 760 is overmolded with an ultraviolet cure adhesive to facilitate increasing a robustness of the conductor-and-printed circuit board interface. In at least some examples, the conductors 720 include at least a third segment 790 housed within the first end cap 630 and/or a fourth segment 800 (shown in FIG. 4) housed within the second end cap 640. The end caps 630, 640 may have a width 810 (shown in FIG. 5) that enables the third segment 790 and the fourth segment 800, respectively, to bend at an angle that controls a bending stress on the conductor 720 (e.g., to facilitate increasing a reliability or decreasing a failure rate associated with the conductor 720).

Figure 8:
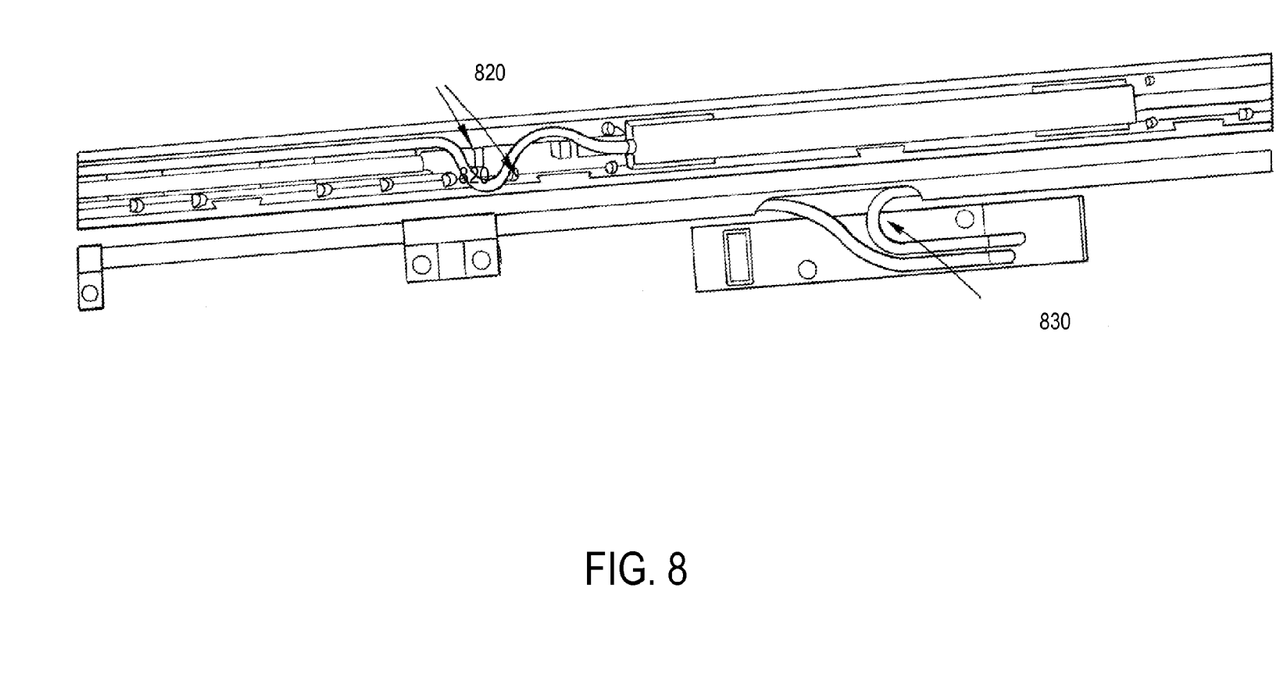

FIG. 8 illustrates an example layout of the conductor 720 and/or the hinge assembly 400 that allows for strain relief and/or slack retention, controls stresses, and/or allows for consistent placement of the conductor 720 within the hinge assembly 400. In some examples, the hinge assembly 400 includes one or more ribs 820 that define a passage through which the conductor 720 is routed. The conductor 720 may weave or "snake" around the ribs 820 to facilitate increasing tautness or decreasing slack in the conductor 720. In this example, the ribs 820 are positioned to facilitate increasing tautness or decreasing slack in the second segment 760 of the conductor 720. Alternatively, the ribs 820 may be positioned at any location that enables the hinge assembly 400 to function as described herein.

In some examples, a service loop 830 may be formed in the conductor 720 to control or manage slack in the conductor 720. For example, the conductor 720 may be soldered onto a PCB 770 oriented such that a longitudinal axis of the PCB 770 extends substantially perpendicular to the hinge assembly 400. After the conductor 720 is soldered onto the PCB 770, the PCB 770 may be rotated counterclockwise approximately 90 degrees such that the longitudinal axis of the PCB 770 is oriented to extend substantially parallel to the hinge assembly 400 and such that the service loop 830 is formed. In this example, the service loop 830 is formed to facilitate increasing tautness or decreasing slack in the first segment 750 of the conductor 720. Alternatively, the service loop 830 may be formed at any location that enables the hinge assembly 400 to function as described herein.

Figure 9:
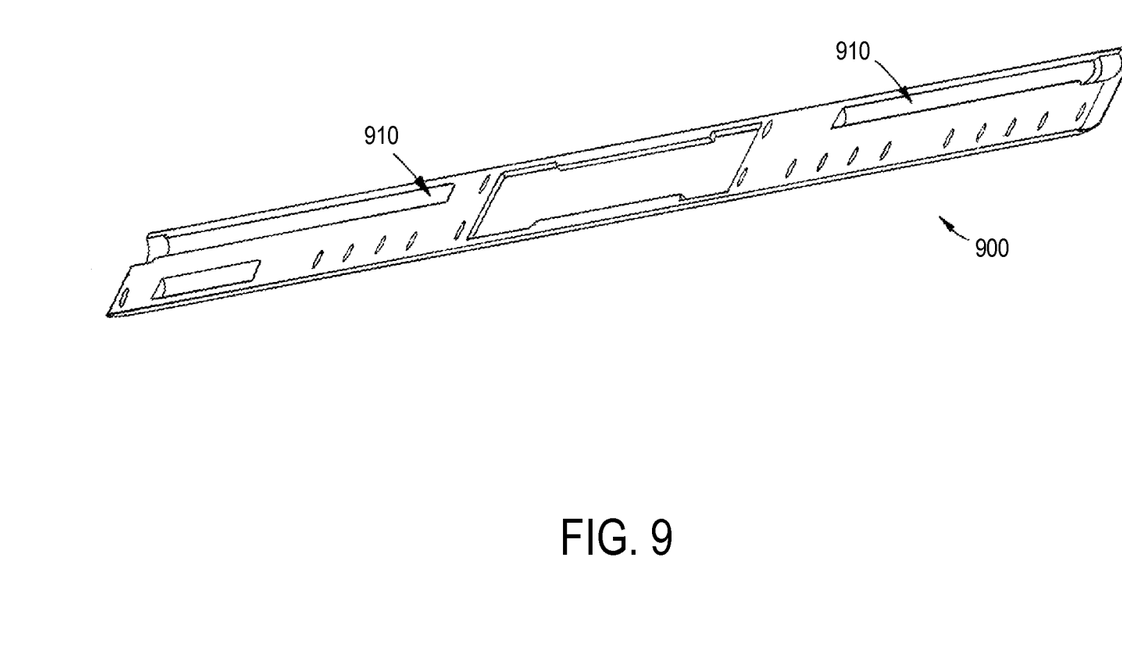
FIG. 9 is a front perspective view of a back piece that may be used with a detachable keyboard, such as the detachable keyboard shown in FIG. 2.

FIG. 9 illustrates a back piece 900 of the hinge assembly 400. The back piece 900 is coupleable to the first hinge body 410 and/or to the second hinge body 480 to enclose or house at least a portion of the conductor 720 within a cavity defined between the back piece 900 and the first hinge assembly 410 and/or the second hinge body 480. In some examples, the back piece 900 is fabricated from aluminum. Alternatively, the back piece 900 may be fabricated from any material that enables the hinge assembly 400 to function as described herein. The back piece 900 includes a substantially semi-cylindrical tunnel, channel, or groove 910 sized to receive at least a portion of the conductor 720. The back piece 900 may be coupled to the second hinge body 480, for example, to help retain the second segment 760 of the conductor 720 within the groove 910. Alternatively, the groove 910 may be defined at any location that enables the hinge assembly 400 to function as described herein.

Figure 10:
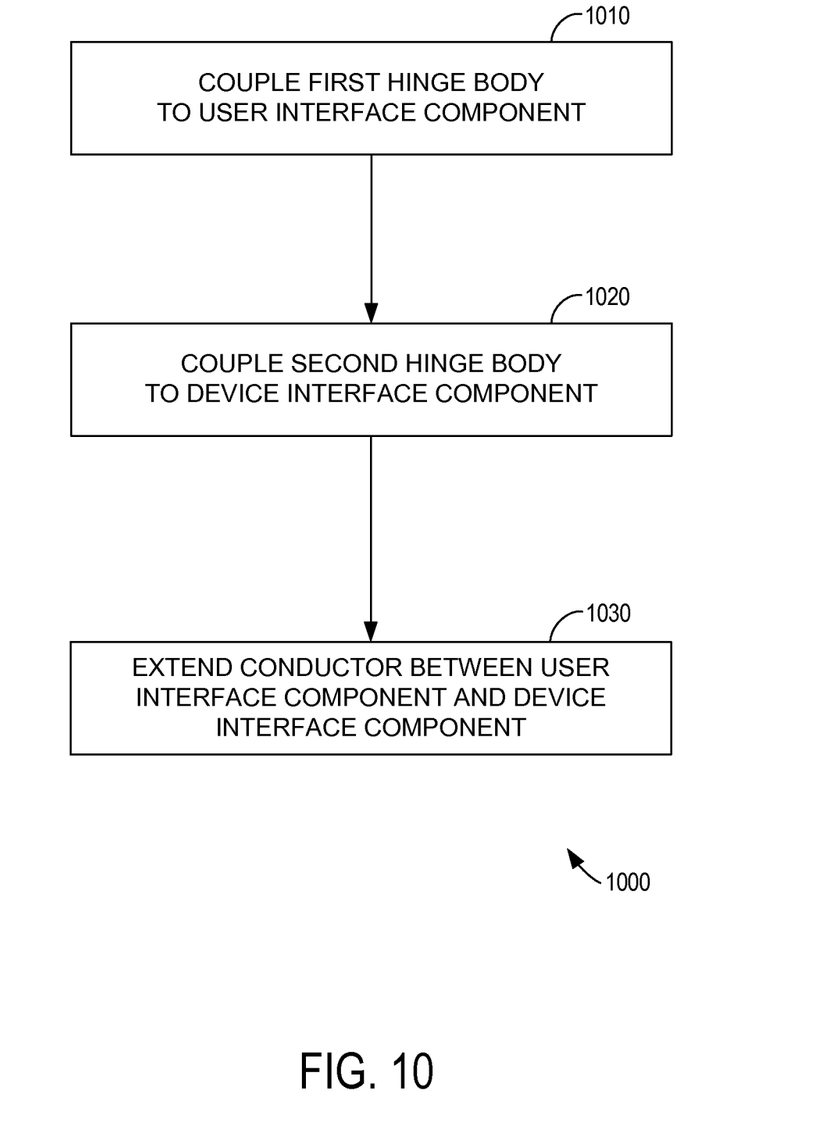
FIG. 10 is a flow chart illustrating an example method of assembling a detachable keyboard, such as the detachable keyboard shown in FIG. 2.

FIG. 10 is a flow chart illustrating an example method 1000 of assembling a detachable keyboard 200. The method 1000 includes coupling, at 1010, a first hinge body 410 to a user interface component 210 such that at least a portion of the first hinge body 410 extends substantially along a first axis 250 of rotation within a first housing cavity 420 at least partially defined by the user interface component 210. In this way, a mechanical hinge is provided between a hinge assembly 400 including the first hinge body 410 and the user interface component 210. At 1020, a second hinge body 480 is coupled to a device interface component 220 such that at least a portion of the second hinge body 480 extends substantially along a second axis 300 within a second housing cavity 490 at least partially defined by the device interface component 220. In this way, a mechanical hinge is provided between the hinge assembly 400 including the second hinge body 480 and the device interface component 220.

One or more conductors 720 are extended at 1030 between the user interface component 210 and the device interface component 220 to couple the user interface component 210 to the device interface component 220. The conductor 720 includes a first segment 750 extending within a first hinge cavity 730 defined by the first hinge body 410 substantially along the first axis 250, and a second segment 760 extending within a second hinge cavity 740 defined by the second hinge body 480 substantially along the second axis 300. In this way, the conductor 720 is discreetly housed along the mechanical hinges of the keyboard 200.

In at least some examples, a first end cap 630 is coupled to a first end portion of the user interface component 210 and to a first end portion of the device interface component 220, such that the first end cap 630 houses a third segment 790 of the conductor 720. In at least some examples, a second end cap 640 is coupled to a second end portion of the user interface component 210 and to a second end portion of the device interface component 220, such that the second end cap 640 houses a fourth segment 800 of the conductor 720.

A mobile device 110 is positionable on a platform 310 of the device interface component 220 to couple the mobile device 110 to the keyboard 200. The mobile device 110 may interface with one or more pins 320, one or more stabilizing mechanisms 330, and/or one or more magnets 340 when the mobile device 110 is coupled to the keyboard 200. When the mobile device 110 is coupled to the keyboard 200, the user interface component 210 receives input from a user 150, and signals are transmitted to the mobile device 110 via the conductors 720 extending between the user interface component 210 and the device interface component 220.

The subject matter described herein enables a physical keyboard to be removably coupled a mobile device. One or more conductors are discreetly routed through mechanical hinges from the user interface component (e.g., keys on a keyboard) to a mobile device via a device interface component. The examples described herein allows for greater rotational freedom, greater robustness and support, and improved aesthetics relative to previous implementations. The subject matter described herein hide and protect the conductors and/or other electronics of the system. It is contemplated that, in at least some examples, the arrangement of the conductors and/or the hinge assembly may be used with any peripheral device, mobile device, and/or computing device that enable the conductors and the hinge assembly to function as described herein. Moreover, a system may include any number of hinge assemblies that enables one device (e.g., a peripheral device) to be coupled to another device (e.g., a user device).

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

The examples illustrated and described herein, as well as examples not specifically described herein but within the scope of aspects of the disclosure, constitute example means for coupling a first hinge body of a hinge assembly to a user interface component, an example means for coupling a second hinge body of the hinge assembly to a device interface component, an example means for extending a conductor between the user interface component and the device interface component to couple the user interface component to the device interface component, an example means for generating friction when a hinge assembly is rotated about a first axis, and/or an example means for biasing a hinge assembly and/or a housing body towards a secured configuration.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," 'including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:
  a user interface component comprising a first housing body aligned substantially along a first axis;
  a device interface component comprising a second housing body aligned substantially along a second axis;
  a hinge assembly comprising a first hinge body and a second hinge body, the first hinge body coupled to the first housing body such that the hinge assembly is movably coupled to the user interface component, and the second hinge body coupled to the second housing body such that the hinge assembly is movably coupled to the device interface component;
  one or more conductors extending between the user interface component and the device interface component to couple the user interface component to the device interface component, the conductors comprising at least a first segment extending substantially along the first axis and a second segment extending substantially along the second axis;
  the user interface component at least partially defining a cavity therein, the first hinge body extending within the cavity such that the hinge assembly is rotatable about the first axis;
  the hinge assembly including a friction generating mechanism that generates friction when the hinge assembly is rotated about the first axis;
  the hinge assembly including a biasing mechanism that is biased toward an extended position, and the first hinge body defines a notch configured to receive the biasing mechanism such that the hinge assembly is secured in a predetermined orientation relative to the first housing body when the biasing mechanism is positioned within the notch;
  the device interface component at least partially defining a cavity therein, the second hinge body extending within the cavity such that the hinge assembly is rotatable about the second axis;
  the hinge assembly rotatable about the second axis, the second hinge body comprises an extension member, and the second housing body defines a slot configured to receive the extension member such that the extension member is moveable within the slot as the hinge assembly is rotated about the second axis;
  the first hinge body at least partially defining a cavity therein, the first segment of the conductors extending within the cavity;
  the second hinge body at least partially defining a cavity therein, the second segment of the conductors extending within the cavity;
  the hinge assembly including a first end cap and a second end cap, at least a portion of the first hinge body extending between the first end cap and the second end cap, at least a portion of the second hinge body extending between the first end cap and the second end cap;
  the first hinge body rotatable about the first axis, and the hinge assembly comprises a first end cap and a second end cap, the first end cap and the second end cap each coupled to the first hinge body such that the first end cap and the second end cap are each configured to rotate about the first axis as the first hinge body is rotated about the first axis;
  the hinge assembly including a first end cap and a second end cap, the conductors comprising a third segment housed within the first end cap and a fourth segment housed within the second end cap;
  a first tubular body coupled to a first housing body aligned substantially along a first axis such that the first tubular body is rotatable about the first axis, the first tubular body at least partially defining a first cavity;

a second tubular body coupled to a second housing body aligned substantially along a second axis such that the second tubular body is rotatable about the second axis, the second tubular body at least partially defining a second cavity;

a conductor extending between the first tubular body and the second tubular body, the conductor comprising at least a first segment extending within the first cavity substantially along the first axis and a second segment extending within the second cavity substantially along the second axis;

the first tubular body defining a notch configured to receive the biasing mechanism such that the first tubular body is secured in a predetermined orientation with respect to the first axis when the biasing mechanism is positioned within the notch;

the second tubular body including an extension member, the second housing body defining a slot configured to receive the extension member such that the extension member is moveable within the slot as the hinge assembly is rotated about the second axis;

at least a portion of the first tubular body extending between the first end cap and the second end cap, at least a portion of the second tubular body extending between the first end cap and the second end cap;

the first end cap and the second end cap each coupled to the first tubular body such that the first end cap and the second end cap are each configured to rotate about the first axis as the first tubular body is rotated about the first axis;

coupling a first hinge body of a hinge assembly to a user interface component such that at least a portion of the first hinge body extends substantially along a first axis within a first housing cavity at least partially defined by the user interface component, the first hinge body defining a first hinge cavity;

coupling a second hinge body of the hinge assembly to a device interface component such that at least a portion of the second hinge body extends substantially along a second axis within a second housing cavity at least partially defined by the device interface component, the second hinge body defining a second hinge cavity;

extending a conductor between the user interface component and the device interface component to couple the user interface component to the device interface component, the conductor including a first segment extending within the first hinge cavity substantially along the first axis and a second segment extending within the second hinge cavity substantially along the second axis;

coupling a first end cap to a first end portion of the user interface component and to a first end portion of the device interface component; and coupling a second end cap to a second end portion of the user interface component and to a second end portion of the device interface component.

While the aspects of the disclosure have been described in terms of various examples with their associated operations, a person skilled in the art would appreciate that a combination of operations from any number of different examples is also within scope of the aspects of the disclosure.

What is claimed is:

1. A keyboard comprising: an input portion comprising a first housing body aligned substantially along a first axis; a device interface comprising a second housing body aligned substantially along a second axis; a hinge assembly comprising a first hinge body a second hinge body, and a biasing mechanism, the first hinge body coupled to the first housing body such that the hinge assembly is movably coupled to the input portion, and the second hinge body coupled to the second housing body such that the hinge assembly is movably coupled to the device interface, wherein the biasing mechanism is biased toward an extended position, and the first hinge body defines a notch configured to receive the biasing mechanism such that the hinge assembly is secured in a predetermined orientation relative to the first housing body when the biasing mechanism is positioned within the notch; and one or more conductors extending between the input portion and the device interface to couple the input portion to the device interface, the one or more conductors comprising at least a first segment extending substantially along the first axis and a second segment extending substantially along the second axis.

2. The keyboard of claim 1, wherein the input portion at least partially defines a cavity therein, the first hinge body extending within the cavity such that the hinge assembly is rotatable about the first axis.

3. The keyboard of claim 1, wherein the hinge assembly comprises a friction generating mechanism that generates friction when the hinge assembly is rotated about the first axis.

4. The keyboard of claim 1, wherein the device interface at least partially defines a cavity therein, the second hinge body extending within the cavity such that the hinge assembly is rotatable about the second axis.

5. The keyboard of claim 1, wherein the hinge assembly is rotatable about the second axis, the second hinge body comprises an extension member, and the second housing body defines a slot configured to receive the extension member such that the extension member is moveable within the slot as the hinge assembly is rotated about the second axis.

6. The keyboard of claim 1, wherein the first hinge body at least partially defines a cavity therein, the first segment of the one or more conductors extending within the cavity.

7. The keyboard of claim 1, wherein the second hinge body at least partially defines a cavity therein, the second segment of the one or more conductors extending within the cavity.

8. The keyboard of claim 1, wherein the hinge assembly comprises a first end cap and a second end cap, at least a portion of the first hinge body extending between the first end cap and the second end cap, at least a portion of the second hinge body extending between the first end cap and the second end cap.

9. The keyboard of claim 1, wherein the first hinge body is rotatable about the first axis, and the hinge assembly comprises a first end cap and a second end cap, the first end cap and the second end cap each coupled to the first hinge body such that the first end cap and the second end cap are each configured to rotate about the first axis as the first hinge body is rotated about the first axis.

10. The keyboard of claim 1, wherein the hinge assembly comprises a first end cap and a second end cap, the one or more conductors comprising a third segment housed within the first end cap and a fourth segment housed within the second end cap.

11. A hinge assembly comprising: a first tubular body coupled to a first housing body aligned substantially along a first axis such that the first tubular body is rotatable about the first axis, the first tubular body at least partially defining a first cavity; a second tubular body coupled to a second housing body aligned substantially along a second axis such that the second tubular body is rotatable about the second axis, the second tubular body at least partially defining a second cavity; and a biasing mechanism that is biased toward an extended position, the first tubular body defining a notch configured to receive the biasing mechanism such that the first tubular body is secured in a predetermined orientation with respect to the first axis when the biasing mechanism is positioned within the notch; and one or more conductors extending between the first tubular body and the second tubular body, the one or more conductors comprising at least a first segment extending within the first cavity substantially along the first axis and a second segment extending within the second cavity substantially along the second axis.

12. The hinge assembly of claim 11, further comprising a friction generating mechanism that generates friction when the hinge assembly is rotated about the first axis.

13. The hinge assembly of claim 11, wherein the second tubular body comprises an extension member, the second housing body defining a slot configured to receive the extension member such that the extension member is moveable within the slot as the hinge assembly is rotated about the second axis.

14. The hinge assembly of claim 11, further comprising:
a first end cap; and
a second end cap, at least a portion of the first tubular body extending between the first end cap and the second end cap, at least a portion of the second tubular body extending between the first end cap and the second end cap.

15. The hinge assembly of claim 11, further comprising:
a first end cap; and
a second end cap, the first end cap and the second end cap each coupled to the first tubular body such that the first end cap and the second end cap are each configured to rotate about the first axis as the first tubular body is rotated about the first axis.

16. The hinge assembly of claim 11, further comprising:
a first end cap; and
a second end cap, the conductor comprising a third segment housed within the first end cap and a fourth segment housed within the second end cap.

17. A method for assembling a keyboard, the method comprising:
coupling a first hinge body of a hinge assembly to an input portion such that at least a portion of the first hinge body extends substantially along a first axis within a first housing cavity at least partially defined by the input portion, the first hinge body defining a first hinge cavity, the first hinge body further defining a notch configured to receive a biasing mechanism such that the hinge assembly is secured in a predetermined orientation when the biasing mechanism is positioned within the notch, the biasing mechanism being biased toward an extended position;

coupling a second hinge body of the hinge assembly to a device interface such that at least a portion of the second hinge body extends substantially along a second axis within a second housing cavity at least partially defined by the device interface, the second hinge body defining a second hinge cavity; and extending one or more conductors between the input portion and the device interface to couple the input portion to the device interface, the one or more conductors including a first segment extending within the first hinge cavity substantially along the first axis and a second segment extending within the second hinge cavity substantially along the second axis.

18. The method of claim 17, further comprising:
coupling a first end cap to a first end portion of the input portion and to a first end portion of the device interface; and
coupling a second end cap to a second end portion of the input portion and to a second end portion of the device interface.

* * * * *